Sept. 16, 1952 P. M. POPE 2,610,879
LOCK SEAL SUITABLE FOR MANUFACTURE IN PLASTICS
Filed Aug. 23, 1949

INVENTOR
Paul M. Pope.
BY Emery, Varney,
Whittemore & Dix
ATTORNEY

Patented Sept. 16, 1952

2,610,879

UNITED STATES PATENT OFFICE 2,610,879

LOCK SEAL SUITABLE FOR MANUFACTURE IN PLASTICS

Paul M. Pope, Greenwich, Conn., assignor to A. Kimball Company, New York, N. Y., a corporation of New York Application August 23, 1949, Serial No. 111,819

3 Claims. (Cl. 292—320)

This invention relates to improvements in lock seals such as are used in closing paper bands or connecting other parts together in such a way that they cannot be separated without detection.

One object of the invention is to provide a lock seal that is of a construction which can be molded from plastics material. Plastics lock seals have an outstanding advantage in that they can be adequately fastened by adhesive to bands of paper or other materials. Another advantage of the invention is economy in manufacture.

Other objects, features and advantages of the invention will appear or be pointed out as the description proceeds.

In the drawing, forming a part hereof, in which like reference characters indicate corresponding parts in all the views, Figure 1 is a top plan view of a lock seal made in accordance with this invention and shown in closed position.

Figure 1:
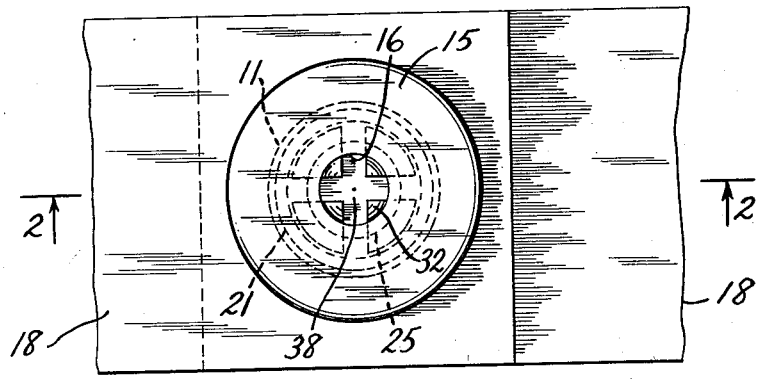
Figure 2:
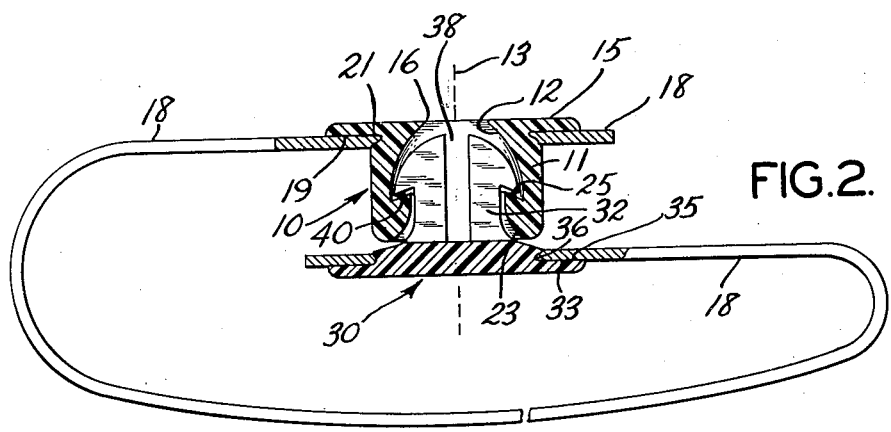
Figure 2 is a sectional view on the line 2—2 of Figure 1 with portions of the band extended to show them as opposite ends of a single band.
Figure 3:
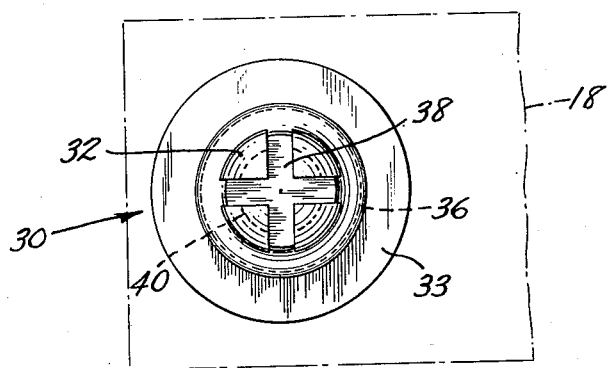
Figure 3 is a top plan view of the lower element of the lock seal shown in Figures 1 and 2.

The lock seal of this invention includes a socket element 10 having a substantially cylindrical body portion 11 in which there is a socket 12 having an axis 13. The socket element 10 has a flange 15 at its upper end, and preferably has an opening 16 at the center of the flange. This opening is not essential, but facilitates the molding of the socket element when making it of plastics material, but it is important that the opening 16 be of limited size with respect to the engaging elements of the seal so that a tool can not be inserted through the opening 16 for releasing the lock seal, as will more fully appear in connection with the description of the locking action.

The flange 15 is secured to one end portion of a paper band 18 by adhesive 19. The socket element shown in the drawing is connected with the band 18 by inserting the body portion 11 through a hole in the band 18. In the preferred construction the upper end of the cylindrical body 11 has a circumferential groove 21 which receives the edge of the paper around the hole in the band 18.

The socket in the element 10 has a tapered entrance 23 and at the end of the tapered entrance there is a recess in the side wall formed by an undercut shoulder 25. This shoulder has a substantially frustro-conical surface with the section of the cone decreasing in cross section in a direction away from the entrance 23 of the socket.

It is not essential that the shoulder 25 have a frustro-conical surface, and it can be made with its surface substantially normal to the axis of the socket, but the locking action of the seal would be destroyed if the surface 25 of the shoulder had a substantial slope inward and toward the socket entrance 23. Beyond the shoulder 25, the side wall of the socket cone converges to its upper end at the opening 16.

The lock seal includes also a latching element 30 which has a stud or body portion 32 extending upward from a flange 33. In the construction shown, the latching element 30 extends through a hole in the band 18 and the flange 33 is secured to the under side of the band by adhesive 35. There is preferably a groove 36 in the latching element for receiving the edge of the hole in the band through which the latching element extends. The stud of the latching element 30 has two intersecting channels which extend at right angles to one another. These channels provide the latching element with a plurality of radially extending grooves 38 which give the latching element resilience so that it can be contracted and then expanded radially when bringing it into engagement with the socket element. There may be more or fewer grooves than illustrated.

The stud or body portion of the latching element 30 has a shoulder 40 extending around its circumference at a region midway between the upper and lower ends of the grooves 38. This shoulder 40, because of its intersection by the grooves 38, is divided up into a plurality of short shoulder segments which comprise projections that hook behind the shoulder 25 of the socket element to lock the latching element 30 in the socket.

The surface of the shoulder 40 is frustro-conical in the illustrated construction, but, as in the case of the shoulder 25, it is not essential that the shoulder 40 have such a surface, and it is sufficient that the shoulder 40 be made of such a shape that it has no substantial slope inward and toward the socket entrance 23 when the parts are engaged with one another.

In order to obtain a strong lock, it is advantageous to use elements having shoulders 25 and 40 which have such a slope with respect to the axis 13 that the shoulder 40 of the latching element actually hooks behind and under the inner edge of the shoulder 25 of the socket. When the elements 10 and 30 are engaged, they cannot be disengaged because the hole 15 in the flange 15 is not large enough to permit access of a tool against the side of the upper end of the latching element. Without being able to exert an inward pressure against the sides of the latching element, the shoulder 40 cannot be contracted sufficiently to pass the shoulder 25 of the socket.

The grooves 38 extend below the shoulder 40 so as to insure radial movement of the shoulder 40 by flexing of the material on the sides of the slots. In order to prevent persons from contracting the shoulder 40 after the elements are in locking engagement, the socket element 10 should extend far enough below its shoulder 25 so as to cover up the outside of the latching element around the slots 38. This prevents radial pressure from being applied to the sides of the latching element after the lock seal is closed.

The socket in the element 10, beyond the shoulder 25, must be deep enough to compensate for the conical shape of the shoulders 25 and 40; that is, the latching element 30 must be able to extend into the socket far enough to permit the low outer edge of the shoulder 40 to slip over the high inner edge of the shoulder 25. This leaves the lock seal with some longitudinal play which is ordinarily not objectionable. If it is desirable to reduce the amount of this play, then the slope of the shoulders 25 and 40 is reduced so as to make them more nearly normal to the axis 13.

The preferred embodiment of the invention has been illustrated and described but changes and modifications can be made, and some features can be used alone or in different combinations without departing from the invention as defined in the claims.

What is claimed is:

1. An article of manufacture comprising a strip, a plastics socket element at one end of the strip, said socket element including a cylindrical body portion with a flange extending radially therefrom, and the flange of said socket element being secured to the strip, a lower end of the cylindrical portion having a socket therein with an axis substantially coincident with the axis of the cylindrical portion, the side wall of the cylinder being of greater thickness at a level intermediate the upper and lower ends of the socket to provide an inwardly extending shoulder, and a plastics latching element at the other end of the strip, said latching element having a flange that contacts with and is secured to a face of the strip, the latching element including an upwardly extending stud of one piece construction with the flange and solid but for a plurality of radially extending grooves which have a depth substantially equal to the height of the stud, and a shoulder on the stud around its periphery and in position to overlap the shoulder in the socket when the flange of the latching element is moved upward to a position adjacent to the lower end of the cylindrical portion of the socket element.

2. An article of manufacture comprising a strip, a plastics socket element at one end of the strip, said socket element including a cylindrical body portion with a flange extending radially therefrom, the cylindrical portion extending through a hole in the strip and the socket element being secured to the strip and having a recess in its side wall at the juncture of the side wall and the flange, the edges of the hole in the strip extending into the recess and the strip around the recess lying against the under surface of the flange, a lower end of the cylindrical portion having a socket therein with an axis substantially coincident with the axis of the cylindrical portion, the side wall of the cylinder being of greater thickness at a level intermediate the upper and lower ends of the socket to provide an inwardly extending shoulder, and a plastics latching element at the other end of the strip, said latching element extending through a hole in the strip and secured to the strip, said latching element having a flange that contacts with the under face of the strip over an area beyond the circumference of the hole, the latching element including an upwardly extending stud of one-piece construction with the flange and solid but for a plurality of radially extending grooves which have a depth substantially equal to the height of the stud, and a shoulder on the stud around its periphery and in position to overlap the shoulder in the socket when the flange of the latching element is moved upward to a position adjacent to the lower end of the cylindrical portion of the socket element.

3. An article of manufacture comprising a strip having holes opening through it near its opposite ends, a socket element extending through the hole at one end and having a flange that contacts with a face of the strip beyond the circumference of the hole, the socket element being secured to the strip and having a solid side wall which is of greater thickness at an intermediate region to provide an inwardly extending shoulder having a frustro-conical upper face, a latching element extending through the hole at the other end of the strip and having a flange that contacts with the portion of the strip beyond the circumference of the hole through which said latching element extends and said latching element being secured to the strip, said latching element including a stud of one-piece construction with the flange and extending upwardly from the flange, the stud having a shoulder intermediate its upper and lower ends, the face of the shoulder being frustro-conical to grip behind the corresponding face of the socket, the stud being solid except for a plurality of radial grooves, and the shoulder on the stud being in position to engage behind the shoulder in the socket when the flange of the stud is brought into a position adjacent to the end of the socket.

PAUL M. POPE.

REFERENCES CITED

The following references are of record in the file of this patent:

UNITED STATES PATENTS

| Number | Name | Date |
|---|---|---|
| 409,034 | Gillespie | Aug. 13, 1889 |
| 412,083 | Gillespie | Oct. 1, 1889 |
| 434,295 | Richardi | Aug. 12, 1890 |
| 1,916,003 | Laencher | June 27, 1933 |
| 2,283,125 | Powell | May 12, 1942 |